No. 786,559. PATENTED APR. 4, 1905.
J. C. W. GRETH.
WATER PURIFYING APPARATUS.
APPLICATION FILED APR. 8, 1904.

Witnesses:
Cyril C. Crick.
F. W. H. Clay

Inventor,
J. C. W. Greth,
per Paul Synnestvedt
Atty.

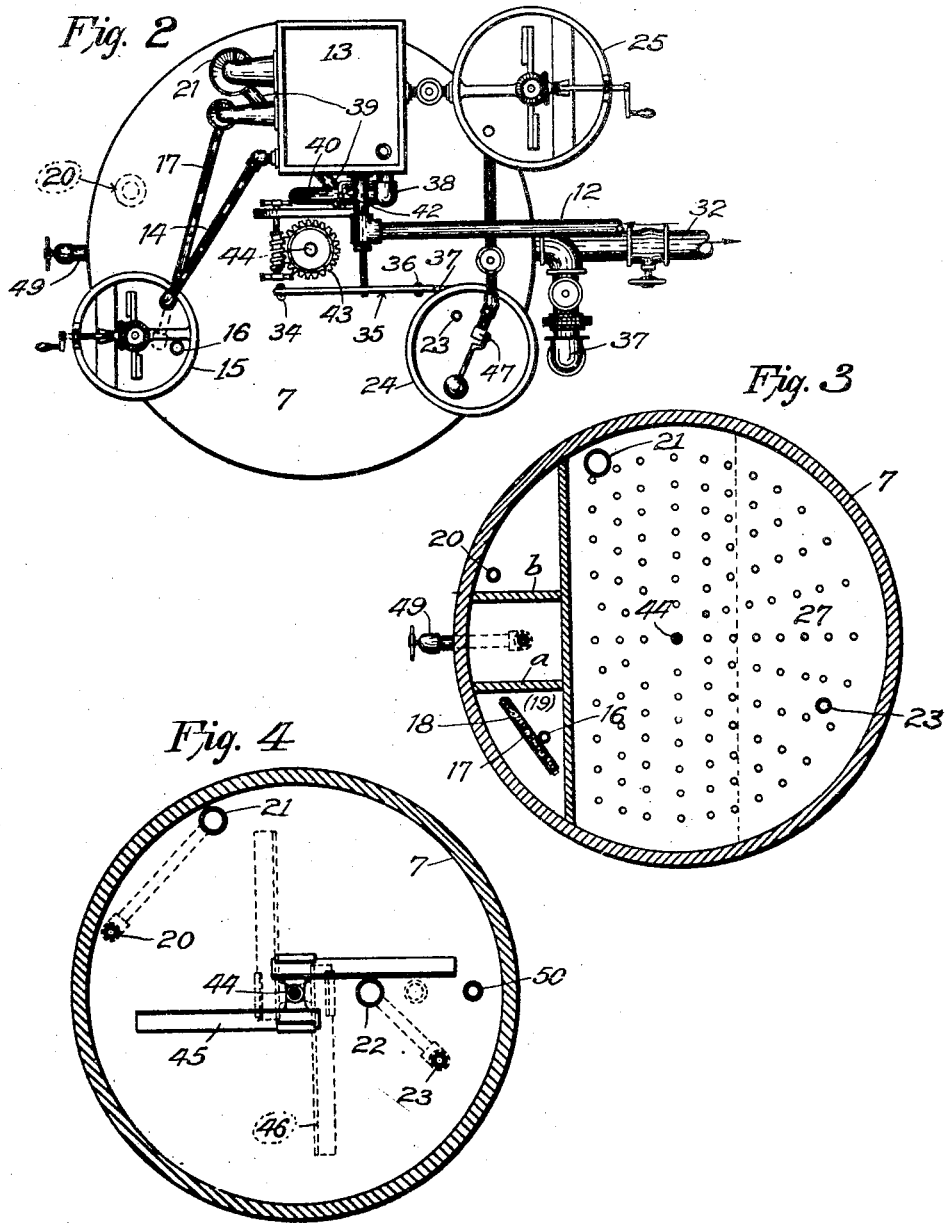

No. 786,559.

Patented April 4, 1905.

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

SPECIFICATION forming part of Letters Patent No. 786,559, dated April 4, 1905.

Application filed April 8, 1904. Serial No. 202,156.

*To all whom it may concern:*

Be it known that I, JOHN C. W. GRETH, a citizen of the United States, residing at Pittsburg, in the State of Pennsylvania, have invented certain new and useful Improvements in Water-Purifying Apparatus, of which the following is a specification.

My invention relates to processes of purifying water by mixing in the same certain chemicals for the purpose of precipitating certain impurities and neutralizing other impurities, &c., and particularly to continuous water purifying apparatus in which there is automatic means for regulating the supply of the different chemicals used dependent upon the volume of flow through the system. The objects of the invention are, to provide in one tank a series of compartments so arranged that there is a continual flow of water therethrough, and the treatment by each chemical is made in a separate compartment and each compartment is fed by overflow from the top of the preceding body of water in the series; to provide superior regulating means for supply of the chemicals governed by a float in the settling tank; to provide a superior regulable cut-off valve for the feeding of the soda solution; to provide means operated by the normal flow of water for stirring the liquid in the various compartments, and to otherwise improve the arrangement of tanks and increase the efficiency of water purifying systems. These objects, and other advantages which will hereinafter appear, I attain by means of the construction illustrated in preferred form in the accompanying drawings, wherein—

Figure 2 is a top plan view of the entire apparatus;

Figures 3 and 4 are horizontal sections taken respectively on lines (3) and (4) in Figure 1, looking downward.

Figure 1:
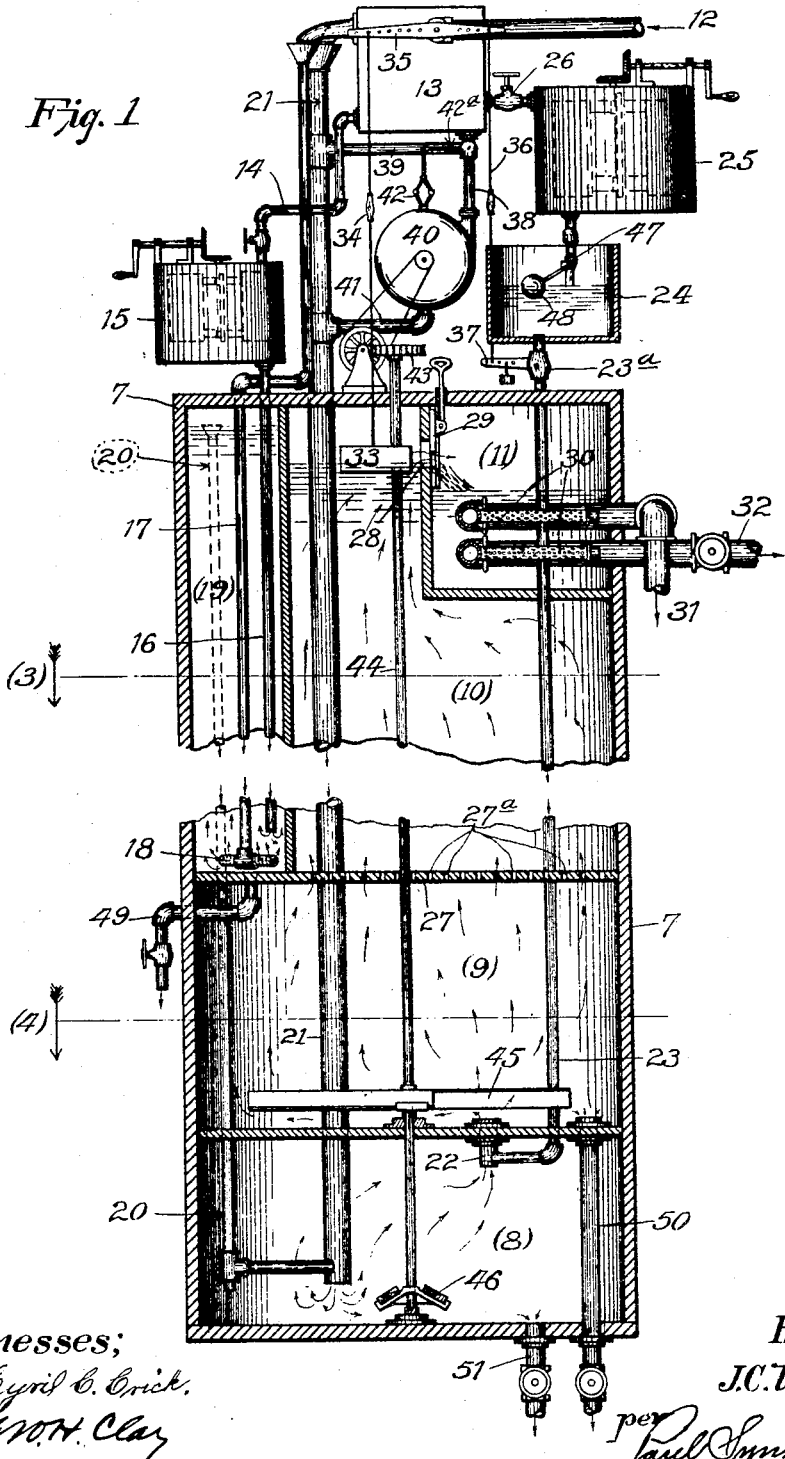
Figure 1 is a vertical central section taken through the purifying tank and other parts of the apparatus, and showing a side elevation of the various feed tanks, &c.

In the apparatus as arranged and shown in the drawings herein, the parts are particularly designed for a continuous flow tower system of water purifying, such as convenient to the use of railway tank stations for the supply of the engine boilers or the like. It will be seen that I use a long tank 7 which contains the entire apparatus inclosed or mounted thereon. The tank 7 contains the lime treatment compartment (8), the soda treatment compartment (9) and the settling compartment (10) at the top of which is a gravity filter 11. The lime saturating compartment (19) shown on the upper left of Figure 1 is the same in structure as that set forth in my Patent No. 753,880, of March 8, 1904 and will be only briefly described herein. The entire system is fed by the supply pipe 12 which empties into a weir box 13. By means of a pipe 14 a portion of the water is emptied into the lime mixing tank 15 in which the calcium oxid is mixed up into cream of lime, and fed by the pipe 16 into the bottom of compartment (19) just above the distributing outlet 18 of the water feed pipe 17 which it will be seen leads from one of the weirs at the top of the box 13. The compartment (19) for the thorough mixing and saturating of the calcium hydrate is arranged with partitions as described in the patent referred to, flow being upward from the outlet 18, over the partition *a* shown in Figure 3, then under the partition *b* therein and thence overflows at the top through a funnel on the pipe 20 as shown in Figure 1.

The pipe 20 introduces the clear lime hydrate directly into the pipe 21, which is fed directly by one of the weirs upon box 13, and the mixed raw water and hydrate empty at once into the bottom of compartment (8). After thorough mixing therein and treatment with lime the water flows upward through the outlet 22 into the compartment (9), and is intermixed immediately at this point with a soda solution or other proper chemical from the pipe 23 which it will be seen is fed from the soda supply tank 24, which in turn is supplied from the soda mixing tank 25, and this latter receives water through the valve 26 directly from the weir box 13.

The water after treatment with the lime is next thoroughly commingled and treated with soda solution in the compartment (9) and thence flows upward through the openings 27ᵃ of perforated partition 27 into the settling compartment (10), from which it will be clear that the sediment into the bottom of compartment (10) is constantly stirred up by the incoming water from compartment (9), and the water thoroughly clarified rises to the top of the settling compartment (10) and flows over the edge 28 of the filter 11 and percolating through the filter passes out by pipes 31 or 32 to a storage tank or for use. The opening leading into the filter is closed by a slide gate 29 when desired.

At some points in the system, and preferably in the top of the settling compartment (10), I provide a float 33 which by means of a link, made regulable in length, by a turnbuckle, 34, engages one end of the lever 35 which controls a valve leading from the supply pipe 12 into the weir box 13. This lever is provided with a series of holes for attachment of the link thereon at various distances from the center of motion, and at the other end of the lever 35 is a link 36 (also supplied with a turnbuckle to regulate its length), which engages the lever 37 controlling the outlet valve 23ᵃ leading from the soda supply tank 24 to the pipe 23. The lever 37 is supplied with a weight as shown, to insure its prompt action, the link is attached to the lever so as to adjust the lever length as may be desired. From this it will be seen that when the level in the settling tank falls the lever 35 is operated to shut off the supply to the whole system from the pipe 12, and at the same time the outlet of the soda supply is closed. By the various adjustments shown the relation between the degree of change in the settling tank level and the amount of opening or closing of the soda supply valve can be regulated to great nicety. It will also be seen that in the soda supply tank 24 I have provided a float 48 governing the inlet valve 47 and thereby preserving a constant head of the soda solution, so that the supply through the valve 23ᵃ will be regulated entirely and accurately by the position of the float 33, after the parts are once adjusted.

In order to facilitate the mixing of the various chemicals I have provided in compartment (8) a stirring paddle 46 and in compartment (9) a stirrer 45, both operated by means of the shaft 44. This shaft may be driven by any preferred means, and I have shown in this apparatus a convenient method of operating it by means of the normal flow of the feed water. The outlet pipe at the bottom of this weir box 13 has two branches 38 and 39, one of which leads into the water motor 40 and after revolving this escapes through the pipe 41 into the pipe 21 leading to the lime reaction tank, and the other, 39, leads direct to pipe 21. Thus it will be seen that the outflow from the weir box is constant and that the motor is operated whenever the system is taking water. The motor 40 is provided with some form of governor as indicated at 42, which operates the lever 42ᵃ of a valve to shut off the water in the pipe 38 and direct it through the pipe 39 when the speed of the motor increases beyond the required speed.

The motor is geared up as indicated in Figure 1 so as to turn the gear 43 on top of the stirrer shaft 44 at uniform speed as shown. It will be understood that in the figure the distance from the weir box 13 to the motor 40 is somewhat distorted, and that the height of these parts will be arranged to give the proper head of water. By the government of the inlet to the weir box 13 and the distance to the motor casing, the head of water upon the motor is practically constant and in case it should vary the regulator will cause the revolution of the stirrers 45 and 46 to be constant. It will be understood of course that instead of this water motor device I may use any other motor to run the stirring device when desired. The tanks 25 and 15 are provided with some form of stirring device for the chemicals therein to make the initial solution of soda and lime respectively. The compartment (19) maintains a constant solution of saturated lime hydrate, and being fed from the top of the pipe 20 the hydrate introduced in compartment (8) is of constant chemical composition and is under a constant head. It will be observed that the raw water introduced into each of the tanks is met immediately at its flow thereinto by the chemical to which it is to be treated and that air is entirely excluded from the mixture after the two come together. The head under which the flow takes place in all the compartments is constant by this apparatus. It will be understood that any sediment which finally works through the perforated diaphragm 27 will fall upon the bottom of compartment (9) and be removed by the drainpipe 50, while the compartment (8) is also cleaned by the sewer outlet 51, as shown in Figure 1.

The filter as shown in this apparatus is a continuous flow mechanical gravity filter and is placed entirely inside of the tank 7. The gate 29 may close the opening from the settling tank and entirely isolate the filter, whereupon by proper connections with a pipe supplying water under a head, the water may be introduced into pipe 32 and discharged through pipe 31, whereby the flow will be reversed through the filter, thoroughly cleaning it out, and in the meanwhile there is no flow through the gate 29, as will be understood. Both the lime and soda treatments are carried on under pressure from the superposed settling compartment, which facilitates the chemical action. By the arrangement of compartments it will be seen that the precipitate or sludge from the settling compartment is discharged into the soda treatment compartment, and this feature I regard as of very great importance since the presence of the sludge from the previous treatment has a very advantageous effect in facilitating the chemical action in the water flowing in from compartment (9). By placing the settling tank immediately above the treatment tank, and by use of the perforated partition and the direct communication with the treatment tank this discharge of sediment is made by gravity alone, and is continuous and certain. And as before stated with reference to the lime tank, the action is also facilitated by being under a head or pressure due to the superposed body of water. Other advantages of the devices will readily occur to those familiar with the art.

Having thus described my invention and illustrated its use, what I claim as new, and desire to secure by Letters Patent, is the following:

1. In water purifying apparatus, a single treatment tank comprising a series of compartments placed in succession one above the other and communicating directly together under continuous head, and means for chemical treatment in the tanks and for maintaining an upward flow therethrough, substantially as described.

2. In water purifying apparatus, the combination of a lime treatment, a soda treatment tank, and a settling tank, all adjoining each other in vertical succession and directly communicating by openings through their separating partitions, means for passing the water successively upward through the tanks, and means for introducing chemicals directly into the lime and soda tanks, substantially as described.

3. In water purifying apparatus, a treatment tank comprising a settling compartment (10) superposed upon and communicating with a soda reaction compartment (9), and a lime treatment compartment (8) placed thereunder and feeding through the bottom of said soda compartment, and means for passing the water upward through the series of tanks and chemically treating it in each.

4. In continuous flow purifying apparatus, the combination of a lime, a soda and a settling compartment, placed one above the other in succession, and the inflow of water into each of said compartments being through the bottom, and means to commingle the chemical just at the point of inflow in each case.

5. In water purifying apparatus, the combination of a settling tank superposed upon and directly communicating with a soda treatment tank, a soda supply tank and means for maintaining a constant level therein, and regulable means operated by a float in the settling tank for controlling the outlet from the soda supply and at the same time the main water supply.

6. In water purifying apparatus, the combination of a settling tank, and a soda treatment tank placed thereunder and communicating therewith, a soda supply vessel, a main water supply pipe, a float in the settling tank governing the main water supply pipe and also the soda outlet, both of the governing valves being adjustable in throw, substantially as described.

7. In water purifying apparatus, a stirring device and a motor therefor operated directly by the normal flow of water into the system, a delivery pipe having two branches and an automatic governor for controlling said motor by shunting a part of the water into one branch of the delivery pipe, substantially as described.

8. In water purifying apparatus, the combination with stirring devices, a feed pipe having two branches, a motor in one of said branches and a governor thereon, and a valve controlling the proportional flow between the two branches operated by said governor and the motion of said motor, and said motor suitably connected to operate the stirring devices.

9. In water purifying apparatus, a lime treatment tank having a water feed pipe therein, and a chemical supply pipe connected therewith—both under the surface of the water in the compartment, an outlet at the top of said tank and a superposed communicating chemical treatment tank, and the latter tank being fed by a chemical supply pipe immediately at the inlet from the first treatment tank, substantially as described.

10. In water purifying apparatus, a tank comprising a settling compartment, and a chemical treatment compartment placed under the settling compartment and separated therefrom by a perforated partition and having means for introducing the chemical directly through its bottom, whereby the sediment from the settling tank is discharged into the treatment compartment to facilitate the chemical action therein.

11. In water purifying apparatus, the combination of a soda treatment tank and a settling tank placed above the same and having a perforated bottom for direct communication therewith, and means for introducing both water and the soda solution through the bottom of the soda treatment tank and causing upward flow therethrough, substantially as described.

12. In water purifying apparatus, a treatment tank containing a lime compartment, a soda compartment and a settling compartment communicating together and placed one above the other in the order named, and means for introducing the treating chemical at the point of inflow into each chemical compartment, substantially as described.

13. In water purifying apparatus the combination of a settling tank having a perforated bottom, a chemical treatment tank under the settling tank and communicating therewith through the bottom, and a stirring device in the treatment tank.

14. In water purifying apparatus a feed reservoir, a treatment tank fed therefrom, a stirrer in the treatment tank and a hydraulic motor for the stirrer operated by the flow from the reservoir to the tank, and means to regulate the speed of the motor while the water-flow into the tank remains constant.

In testimony whereof I have hereunder signed my name in the presence of the two subscribed witnesses.

JOHN C. W. GRETH.

Witnesses:
F. W. H. CLAY,
CHAS. H. EBERT.